(12) United States Patent
Wu et al.

(10) Patent No.: US 12,534,376 B2
(45) Date of Patent: Jan. 27, 2026

(54) METHOD OF PURIFYING SODIUM BROMIDE FROM WASTE CIRCUIT BOARDS PYROLYSIS COKE

(71) Applicant: BEIJING UNIVERSITY OF TECHNOLOGY, Beijing (CN)

(72) Inventors: Yufeng Wu, Beijing (CN); Gongqi Liu, Beijing (CN); De-an Pan, Beijing (CN)

(73) Assignee: BEIJING UNIVERSITY OF TECHNOLOGY, Beijing (CN)

(*) Notice: Subject to any disclaimer, the term of this patent is extended or adjusted under 35 U.S.C. 154(b) by 691 days.

(21) Appl. No.: 17/867,618

(22) Filed: Jul. 18, 2022

(65) Prior Publication Data

US 2022/0356067 A1 Nov. 10, 2022

Related U.S. Application Data

(63) Continuation-in-part of application No. 17/351,083, filed on Jun. 17, 2021, now abandoned, which is a (Continued)

(30) Foreign Application Priority Data

Dec. 25, 2019 (CN) .......................... 201911359343.6

(51) Int. Cl.
*C01D 3/10* (2006.01)
*C01D 3/16* (2006.01)
(Continued)

(52) U.S. Cl.
CPC ................. *C01D 3/10* (2013.01); *C01D 3/16* (2013.01); *C22B 1/06* (2013.01); *C22B 26/10* (2013.01); *C01P 2006/80* (2013.01)

(58) Field of Classification Search
None
See application file for complete search history.

(56) References Cited

U.S. PATENT DOCUMENTS 11,198,615 B2 * 12/2021 Wu .......................... C01G 9/06

FOREIGN PATENT DOCUMENTS

| CN | 106185939 A | * | 12/2016 | |
| CN | 108118157 A | * | 6/2018 | ............... C01F 11/46 |
| FR | 2994659 A1 | * | 2/2014 | ......... B01D 11/0288 |

OTHER PUBLICATIONS

CN 106185939 machine translation (Year: 2016).*
FR 2994659 A1, machine translation (Year: 2012).*
Screenshot of Condorchem webpage (Year: 2019).*

* cited by examiner

*Primary Examiner* — Michael Forrest
*Assistant Examiner* — Nicole Lee Quist
(74) *Attorney, Agent, or Firm* — J.C. PATENTS

(57) ABSTRACT

A method for producing and purifying sodium bromide using the coke from waste circuit boards pyrolysis residues as reducing agent, belonging to the field of purifying sodium bromide and high-value utilization, and more particularly, relating to a method for reducing and purifying crude bromine salt obtained from waste circuit boards smelting ash by using the coke in waste circuit boards pyrolysis residues. The main steps are as follows: carbonization conversion, water dissolution, filtration, and concentrated crystallization under vacuum heating. The pure sodium bromide was obtained by reducing crude bromine salt enriched from waste circuit board smelting ash by using the coke in waste circuit boards pyrolysis residues, realizing the resource coupling and high-value utilization of the two wastes, avoiding the secondary pollution in the process of recycling the waste circuit boards. It has the characteristics of simple operation, high resource utilization rate and no tail liquid discharge.

3 Claims, 3 Drawing Sheets

Related U.S. Application Data continuation of application No. PCT/CN2020/127972, filed on Nov. 11, 2020.

(51) Int. Cl.
*C22B 1/06* (2006.01)
*C22B 26/10* (2006.01)

METHOD OF PURIFYING SODIUM BROMIDE FROM WASTE CIRCUIT BOARDS PYROLYSIS COKE

CROSS-REFERENCE TO RELATED APPLICATIONS

This application is continuation-in-part of application Ser. No. 17/351,083, filed on Jun. 17, 2021, which is a continuation of International Application No. PCT/CN2020/127972, filed on Nov. 11, 2020, which in turn claims priority to Chinese Patent Application No. 201911359343.6, filed on Dec. 25, 2019, the contents of the above applications are hereby incorporated by reference in their entireties.

FIELD IN THE INVENTION

The invention relates to a recovery technology for collaborative treatment and high-value utilization of smelting ash and pyrolysis residues of waste circuit boards, especially relating to a new method for using the coke in pyrolysis residues of waste circuit boards to reduce crude bromine salt obtained from smelting ash of waste circuit boards.

BACKGROUND TECHNOLOGY

Waste circuit boards are the most valuable part in waste electronic appliances, but it is difficult to be treated, and its treatment is the core of high value utilization of electronic appliances. At present, the main treatment methods are physical separation, pyrometallurgy treatment and hydrometallugy treatment, as well as gradually developing biological treatment technologies. The treatment characteristics of these recovery technologies are shown in table 1. Among them, metal and nonmetal enrichment can be obtained by physical separation, while hydrometallurgy and biometallurgy are mostly focused on the recovery of metals in waste circuit boards, metal alloy can be quickly obtained and nonmetal resources can be used by smelting and pyrolysis in pyrometallurgy technology, which has a good volume reduction effect. Pyrometallurgy and pyrolysis technology are considered to be the most effective technology for high value utilization of waste circuit boards, which can effectively recover metal, resin and fiberglass.

With the progress of technologies, advanced and dissolvable smelting technology has been applied to the treatment of waste circuit boards and has been regarded as the mainstream technology for the treatment of waste circuit boards in Europe, America, Japan and other developed countries. Typically, Umicore uses ISA top blowing smelting technology to treat waste circuit boards and copper concentrates, and Boliden uses Kaldor furnace and Ausmelt top blowing smelting technology to treat mobile phone and computer circuit boards et al are successful cases of whole-body utilization. The successful implementation of this technology is conducive to fundamentally changing the traditional incineration mode and reducing the environmental problems caused by incineration. Due to the large amount of brominated flame retardant contained in circuit boards, there are a lot of bromides in the waste circuit board smelting ash. Application No. 201711490199.0 proposed a method of enriching the bromides in the smelting ash by sulphating roasting-alkali washing spray method to obtain crude bromine salt. This method has good effect on removing and enriching bromides in the smelting ash of waste circuit boards, but the obtained crude bromine salt has not been further purified and its high value utilization needs to be further studied.

The waste circuit boards are heated to a certain temperature (>650 K) in the presence or absence of oxygen by pyrolysis technology of waste circuit boards to decompose the organic matters, such as epoxy resin, into gas and liquid pyrolysis oil, while the metal, coke and fiberglass together form solid waste (pyrolysis residues). For the pyrolysis residues from pyrolysis, the current research mainly focuses on the comprehensive recovery of gas and oil and the recycling of metal in the pyrolysis products, while the research on the recovery of nonmetal in the pyrolysis residues is less. The method of preparing polypropylene composites using fiberglass in pyrolysis residues of waste circuit boards proposed in application No. CN201010529818.4 realizes the high value utilization of fiberglass in pyrolysis residues, but the coke was directly incinerated without realizing its secondary utilization.

The crude bromide salt is a by-product obtained from smelting ash of waste circuit boards through sulphating roasting—alkali washing—neutralization precipitation and evaporation crystallization, which contains NaBr, NaBrO and $NaBrO_3$. The traditional treatment method of crude bromide salt is to add pure reducing agent to get sodium bromide solution by heating reduction, and then bromine is obtained by electrodialysis membrane process or chlorination process, which has the disadvantages of high cost and complex operating environment. The recovery of pyrolysis residues of waste circuit boards often focuses on the recovery of metal and fiberglass, while the coke in which is often directly calcined, which wastes its resource value. In conclusion, in view of the characteristics of smelting and pyrolysis technology of waste circuit boards in China, as

TABLE 1

Comparison of main treatment technologies for waste circuit boards

| Treatment Technology | Treatment Speed | Recovery Product | Secondary Pollution | Operation Cost | Effect of Volume and Mass Reduction | Separation Effect of Nonmetal Material |
| --- | --- | --- | --- | --- | --- | --- |
| Smelting treatment | Fast | Thermal energy | High | High | Best | Good |
| Pyrolysis treatment | Fast | Metal, oil, gas | Very low | Lower than calcination | Good | Best |
| Physical selection | Faster | Metal, nonmetal | Lower | Low | Medium | Bad |
| Hydrometallurgy | Faster | Metal | High | General | Medium | Bad |
| Biometallurgy | Slow | Metal | Low | Low | Bad | Bad | well as the treatment situation of secondary waste produced in the recovery process, it is urgent to develop full component recovery technology of smelting ash and pyrolysis residues of waste circuit boards. The invention proposes a new method for reducing the crude bromine salt using the coke in pyrolysis residues of waste circuit boards, and pure sodium bromide (NaBr) is obtained through carbonization conversion, water dissolution, filtration, and concentrated crystallization under vacuum heating. It realizes the resource coupling and integrated utilization of the two types of wastes, having the advantages of simple operation, high resource utilization rate, environment-friendly, etc.

SUMMARY OF THE INVENTION

The purpose of the invention is mainly to solve the problem of high value utilization of smelting ash and pyrolysis residues of waste circuit boards. A new method for the production and purification of sodium bromide from bromine salt by using the coke as a reducing agent was proposed. It realizes the resource coupling and integrated utilization of the two types of wastes (smelting ash and pyrolysis residues), and has the characteristics of simple operation, high resource utilization rate, environment-friendly, etc.

The method for producing and purifying sodium bromide using the coke from pyrolysis residues of waste circuit boards as reducing agent is as follows:

(1) Carbonization conversion: the crude bromine salt is mixed with the coke separated from the pyrolysis residues of waste circuit boards to obtain a mixture. The crude bromide salt is a by-product obtained from smelting ash of waste circuit boards through sulphating roasting—alkali washing—neutralization precipitation and evaporation crystallization, which contains NaBr, NaBrO and $NaBrO_3$. Then the mixture is heated to obtain carbon monoxide and the crude sodium bromide (containing NaBr and C from coke). The carbon monoxide is collected and used as raw material of water gas. During mixing, the mass of the coke is 0.1~1.0 kg per kilogram of crude bromine salt, the temperature is 250~450° C., and the time is 1.0~2.0 h;

(2) Water dissolution and filtration: the crude sodium bromide obtained in step (1) is added to distilled water for dissolution and filtration to obtain insoluble impurities (containing C) and leachate containing NaBr. During the water dissolution and filtration, the liquid-solid volume mass ratio (distilled water to primary product of sodium bromide) is 8:1~3:1 (L/kg), the temperature is 50~80° C., and the time is 20~60 min;

(3) Concentrated crystallization under vacuum heating: the leachate containing NaBr obtained in step (2) is concentrated and crystallized by vacuum heating to obtain sodium bromide (NaBr). During the concentrated crystallization, the time is 30~60 min and the temperature is 60~150° C. This step is carried out in a vacuum evaporation device, which includes an evaporator, a solvent collecting tank and a vacuum system. The evaporator is communicated with the solvent collecting tank and the vacuum system respectively, a condenser and a material head tank are arranged on the evaporator and respectively communicated with the same, and the vacuum system is communicated with the condenser and the solvent collecting tank respectively, so that pressure in the condenser can be kept balanced with that of the solvent colleting tank and liquefied solvent in the condenser flows into the solvent collecting tank automatically.

Compared with the prior art, the present invention uses one kind of waste generated in the recycling process of waste circuit boards to treat another kind of waste. This is a new recycling method with the coke in the pyrolysis residues of waste circuit boards as reducing agent to reduce the crude bromine salt obtained in the smelting ash of waste circuit boards, so as to reduce the high valence bromate in the crude bromine salt to produce pure sodium bromide without additional reducing agent in the implementation process and no other impurities is introduced. It realizes the resource coupling and integrated utilization of the two wastes, and having the characteristics of simple operation, high resource utilization rate, environment-friendly, etc.

EXEMPLARY EMBODIMENTS

Figure 1:
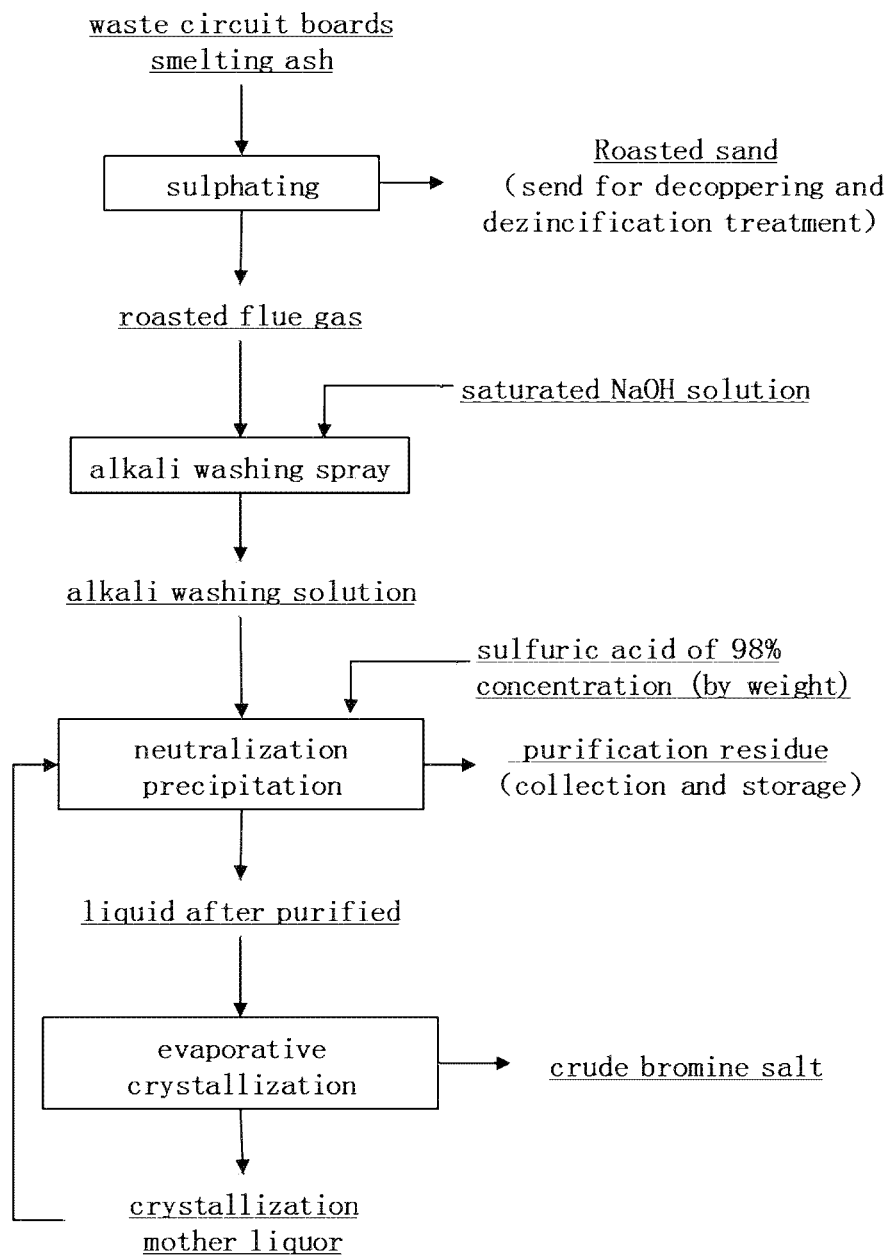
FIG. 1 shows the process flow diagram of obtaining crude bromine salt from waste circuit board smelting ash.
Figure 2:
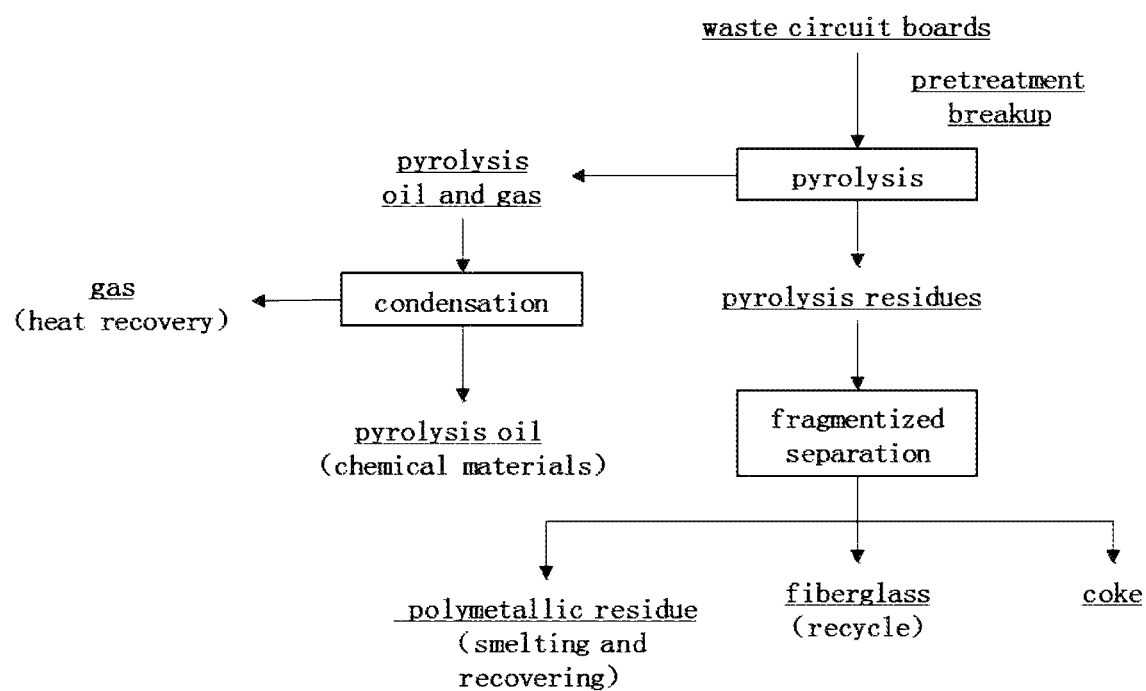
FIG. 2 shows the process flow diagram of obtaining the coke from pyrolysis residues of waste circuit boards.
Figure 3:
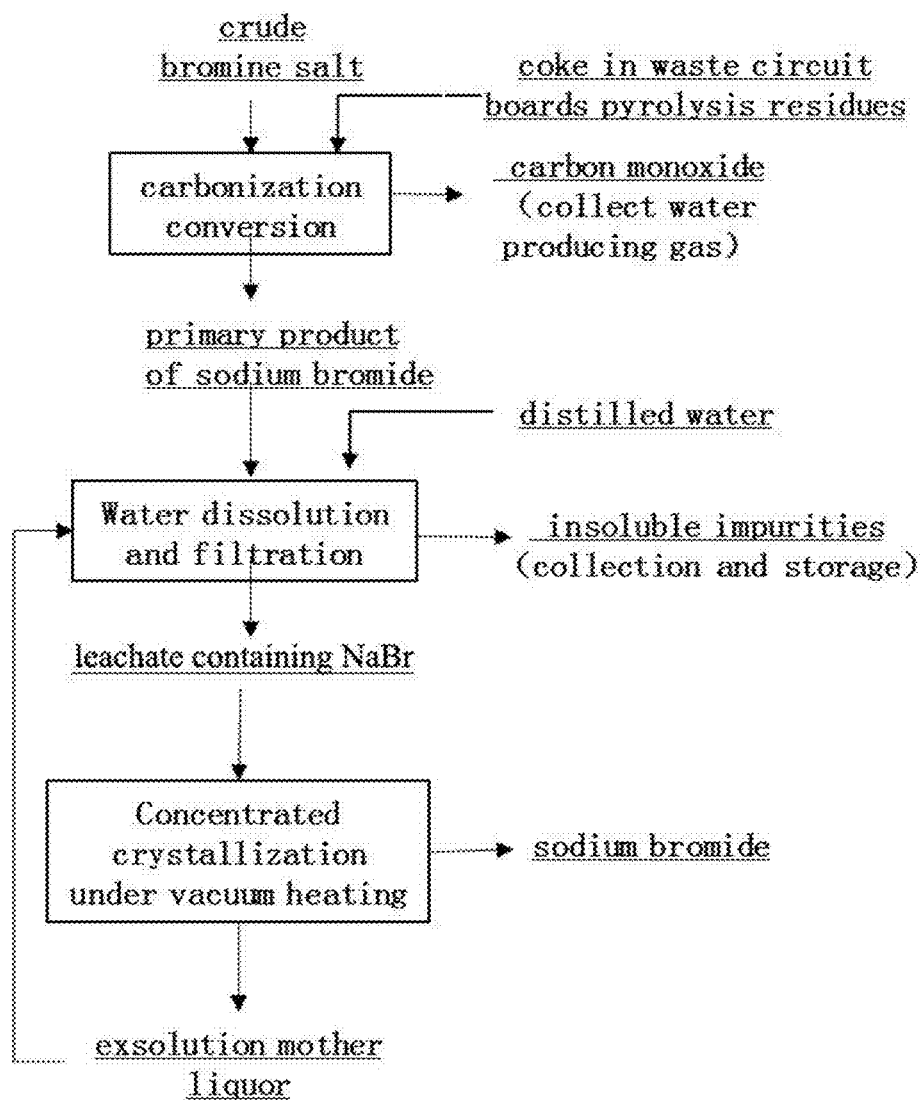
FIG. 3 shows the process flow diagram of producing and purifying sodium bromide using the coke from pyrolysis residues of waste circuit boards as reducing agent.

The following exemplary embodiments are intended to further illustrate the invention rather than limit it.

Exemplary Embodiment 1

The recovery steps are as follows:

(1) Carbonization conversion: the crude bromine salt is mixed with the coke separated from the pyrolysis residues of waste circuit boards to obtain a mixture. The crude bromide salt is a by-product obtained from smelting ash of waste circuit boards through sulphating roasting—alkali washing—neutralization precipitation and evaporation crystallization, which contains NaBr, NaBrO and $NaBrO_3$. Then the mixture is heated to obtain carbon monoxide and the crude sodium bromide (containing NaBr and C from coke). The carbon monoxide is collected and used as raw material of water gas. During mixing, the mass of the coke is 0.1 kg per kilogram of crude bromine salt, the temperature is 250° C., and the time is 1.0 h;

(2) Water dissolution and filtration: the crude sodium bromide obtained in step (1) is added to distilled water for dissolution and filtration to obtain insoluble impurities (containing C) and NaBr—containing leachate. During the water dissolution and filtration, the liquid-solid volume mass ratio (distilled water to primary product of sodium bromide) is 8:1 (L/kg), the temperature is 50° C., and the time is 20 min;

(3) Concentrated crystallization under vacuum heating: the leachate containing NaBr obtained in step (2) is concentrated and crystallized by vacuum heating to obtain sodium bromide (NaBr). During the concentrated crystallization, the time is 60 min and the temperature is 60° C. This step is carried out in a vacuum evaporation device, which includes an evaporator, a solvent collecting tank and a vacuum system. The evaporator is communicated with the solvent collecting tank and the vacuum system respectively, a condenser and a material head tank are arranged on the evaporator and respectively communicated with the same, and the vacuum system is communicated with the condenser and the solvent collecting tank respectively, so that pressure in the condenser can be kept balanced with that of the solvent colleting tank and liquefied solvent in the condenser flows into the solvent collecting tank automatically.

The purity of the obtained sodium bromide is 98.6%, which meets the standard of the first grade sodium bromide (NaBr≥98.5%) in the standard HG/T 3809-2006 of State Ministry of Chemical Industry.

Exemplary Embodiment 2

The recovery steps are as follows:
(1) Carbonization conversion: the crude bromine salt is mixed with the coke separated from the pyrolysis residues of waste circuit boards to obtain a mixture. The crude bromide salt is a by-product obtained from smelting ash of waste circuit boards through sulphating roasting—alkali washing—neutralization precipitation and evaporation crystallization, which contains NaBr, NaBrO and $NaBrO_3$. Then the mixture is heated to obtain carbon monoxide and the crude sodium bromide (containing NaBr and C from coke). The carbon monoxide is collected and used as raw material of water gas. During mixing, the mass of the coke is 1.0 kg per kilogram of crude bromine salt, the temperature is 450° C., and the time is 2.0 h;
(2) Water dissolution and filtration: the crude sodium bromide obtained in step (1) is added to distilled water for dissolution and filtration to obtain insoluble impurities (containing C) and NaBr-containing leachate. During the water dissolution and filtration, the liquid-solid volume mass ratio (distilled water to primary product of sodium bromide) is 3:1 (L/kg), the temperature is 80° C., and the time is 60 min;
(3) Concentrated crystallization under vacuum heating: the leachate containing NaBr obtained in step (2) is concentrated and crystallized by vacuum heating to obtain sodium bromide (NaBr). During the concentrated crystallization, the time is 30 min and the temperature is 150° C. This step is carried out in a vacuum evaporation device, which includes an evaporator, a solvent collecting tank and a vacuum system. The evaporator is communicated with the solvent collecting tank and the vacuum system respectively, a condenser and a material head tank are arranged on the evaporator and respectively communicated with the same, and the vacuum system is communicated with the condenser and the solvent collecting tank respectively, so that pressure in the condenser can be kept balanced with that of the solvent colleting tank and liquefied solvent in the condenser flows into the solvent collecting tank automatically.

The purity of the obtained sodium bromide is 99.4%, which meets the standard of the superior product sodium bromide (NaBr≥99%) in the standard HG/T 3809-2006 of State Ministry of Chemical Industry.

Exemplary Embodiment 3

The recovery steps are as follows:
(1) Carbonization conversion: the crude bromine salt is mixed with the coke separated from the pyrolysis residues of waste circuit boards to obtain a mixture. The crude bromide salt is a by-product obtained from smelting ash of waste circuit boards through sulphating roasting—alkali washing—neutralization precipitation and evaporation crystallization, which contains NaBr, NaBrO and $NaBrO_3$. Then the mixture is heated to obtain carbon monoxide and the crude sodium bromide (containing NaBr and C from coke). The carbon monoxide is collected and used as raw material of water gas. During mixing, the mass of the coke is 0.4 kg per kilogram of crude bromine salt, the temperature is 300° C., and the time is 1.2 h;
(2) Water dissolution and filtration: the crude sodium bromide obtained in step (1) is added to distilled water for dissolution and filtration to obtain insoluble impurities (containing C) and NaBr-containing leachate. During the water dissolution and filtration, the liquid-solid volume mass ratio (distilled water to primary product of sodium bromide) is 7:1 (L/kg), the temperature is 60° C., and the time is 25 min;
(3) Concentrated crystallization under vacuum heating: the leachate containing NaBr obtained in step (2) is concentrated and crystallized by vacuum heating to obtain sodium bromide (NaBr). During the concentrated crystallization, the time is 50 min and the temperature is 100° C. This step is carried out in a vacuum evaporation device, which includes an evaporator, a solvent collecting tank and a vacuum system. The evaporator is communicated with the solvent collecting tank and the vacuum system respectively, a condenser and a material head tank are arranged on the evaporator and respectively communicated with the same, and the vacuum system is communicated with the condenser and the solvent collecting tank respectively, so that pressure in the condenser can be kept balanced with that of the solvent colleting tank and liquefied solvent in the condenser flows into the solvent collecting tank automatically.

The purity of the obtained sodium bromide is 98.8%, which meets the standard of the first grade sodium bromide (NaBr≥98.5%) in the standard HG/T 3809-2006 of State Ministry of Chemical Industry.

Exemplary Embodiment 4

The recovery steps are as follows:
(1) Carbonization conversion: the crude bromine salt is mixed with the coke separated from the pyrolysis residues of waste circuit boards to obtain a mixture. The crude bromide salt is a by-product obtained from smelting ash of waste circuit boards through sulphating roasting—alkali washing—neutralization precipitation and evaporation crystallization, which contains NaBr, NaBrO and $NaBrO_3$. Then the mixture is heated to obtain carbon monoxide and the crude sodium bromide (containing NaBr and C from coke). The carbon monoxide is collected and used as raw material of water gas. During mixing, the mass of the coke is 0.8 kg per kilogram of crude bromine salt, the temperature is 400° C., and the time is 1.8 h;
(2) Water dissolution and filtration: the crude sodium bromide obtained in step (1) is added to distilled water for dissolution and filtration to obtain insoluble impurities (containing C) and NaBr-containing leachate. During the water dissolution and filtration, the liquid-solid volume mass ratio (distilled water to primary product of sodium bromide) is 6:1 (L/kg), the temperature is 75° C., and the time is 50 min;

(3) Concentrated crystallization under vacuum heating: the leachate containing NaBr obtained in step (2) is concentrated and crystallized by vacuum heating to obtain sodium bromide (NaBr). During the concentrated crystallization, the time is 40 min and the temperature is 130° C. This step is carried out in a vacuum evaporation device, which includes an evaporator, a solvent collecting tank and a vacuum system. The evaporator is communicated with the solvent collecting tank and the vacuum system respectively, a condenser and a material head tank are arranged on the evaporator and respectively communicated with the same, and the vacuum system is communicated with the condenser and the solvent collecting tank respectively, so that pressure in the condenser can be kept balanced with that of the solvent colleting tank and liquefied solvent in the condenser flows into the solvent collecting tank automatically.

The purity of the obtained sodium bromide is 99.2%, which meets the standard of the superior product sodium bromide (NaBr≥99%) in the standard HG/T 3809-2006 of State Ministry of Chemical Industry.

Exemplary Embodiment 5

The recovery steps are as follows:
(1) Carbonization conversion: the crude bromine salt is mixed with the coke separated from the pyrolysis residues of waste circuit boards to obtain a mixture. The crude bromide salt is a by-product obtained from smelting ash of waste circuit boards through sulphating roasting—alkali washing—neutralization precipitation and evaporation crystallization, which contains NaBr, NaBrO and $NaBrO_3$. Then the mixture is heated to obtain carbon monoxide and the crude sodium bromide (containing NaBr and C from coke). The carbon monoxide is collected and used as raw material of water gas. During mixing, the mass of the coke is 0.5 kg per kilogram of crude bromine salt, the temperature is 350° C., and the time is 1.5 h;
(2) Water dissolution and filtration: the crude sodium bromide obtained in step (1) is added to distilled water for dissolution and filtration to obtain insoluble impurities (containing C) and leachate containing NaBr. During the water dissolution and filtration, the liquid-solid volume mass ratio (distilled water to primary product of sodium bromide) is 4:1 (L/kg), the temperature is 70° C., and the time is 40 min;
(3) Concentrated crystallization under vacuum heating: the leachate containing NaBr obtained in step (2) is concentrated and crystallized by vacuum heating to obtain sodium bromide (NaBr). During the concentrated crystallization, the time is 45 min and the temperature is 120° C. This step is carried out in a vacuum evaporation device, which includes an evaporator, a solvent collecting tank and a vacuum system. The evaporator is communicated with the solvent collecting tank and the vacuum system respectively, a condenser and a material head tank are arranged on the evaporator and respectively communicated with the same, and the vacuum system is communicated with the condenser and the solvent collecting tank respectively, so that pressure in the condenser can be kept balanced with that of the solvent colleting tank and liquefied solvent in the condenser flows into the solvent collecting tank automatically.

The purity of the obtained sodium bromide is 98.9%, which meets the standard of the first grade sodium bromide (NaBr≥98.5%) in the standard HG/T 3809-2006 of State Ministry of Chemical Industry.

Exemplary Embodiment 6

The recovery steps are as follows:
(1) Carbonization conversion: the crude bromine salt is mixed with the coke separated from the pyrolysis residues of waste circuit boards to obtain a mixture. The crude bromide salt is a by-product obtained from smelting ash of waste circuit boards through sulphating roasting—alkali washing—neutralization precipitation and evaporation crystallization, which contains NaBr, NaBrO and $NaBrO_3$. Then the mixture is heated to obtain carbon monoxide and the crude sodium bromide (containing NaBr and C from coke). The carbon monoxide is collected and used as raw material of water gas. During mixing, the mass of the coke is 0.6 kg per kilogram of crude bromine salt, the temperature is 350° C., and the time is 16 h;
(2) Water dissolution and filtration: the crude sodium bromide obtained in step (1) is added to distilled water for dissolution and filtration to obtain insoluble impurities (containing C) and leachate containing NaBr. During the water dissolution and filtration, the liquid-solid volume mass ratio (distilled water to primary product of sodium bromide) is 5:1 (L/kg), the temperature is 70° C., and the time is 45 min;
(3) Concentrated crystallization under vacuum heating: the leachate containing NaBr obtained in step (2) is concentrated and crystallized by vacuum heating to obtain sodium bromide (NaBr). During the concentrated crystallization, the time is 30 min and the temperature is 80° C. This step is carried out in a vacuum evaporation device, which includes an evaporator, a solvent collecting tank and a vacuum system. The evaporator is communicated with the solvent collecting tank and the vacuum system respectively, a condenser and a material head tank are arranged on the evaporator and respectively communicated with the same, and the vacuum system is communicated with the condenser and the solvent collecting tank respectively, so that pressure in the condenser can be kept balanced with that of the solvent colleting tank and liquefied solvent in the condenser flows into the solvent collecting tank automatically.

The purity of the obtained sodium bromide is 99.1%, which meets the standard of the superior product sodium bromide (NaBr≥99.0%) in the standard HG/T 3809-2006 of State Ministry of Chemical Industry.

The above embodiments are only used to illustrate the preferred embodiments of the invention, but the invention is not limited to the above embodiments. Within the scope of knowledge possessed by those skilled in the art and on the premise of not departing from the science and design spirit in the invention, the modifications, equivalent substitutions and improvements et al. made on the spirit and principles of the invention shall be regarded as in the scope of protection of the application.

The invention claimed is:
1. A method for producing and purifying sodium bromide using coke from pyrolysis residues of waste circuit boards as reducing agent, characterized by the following specific steps:

(1) carbonization conversion: crude bromine salt is mixed with the coke from the pyrolysis residues of waste circuit boards to obtain a mixture; the crude bromide salt is a by-product obtained from smelting ash of waste circuit boards, which contains NaBr, NaBrO and $NaBrO_3$; the mixture is heated at a temperature of 250-450° C. for 1.0-2.0 h to obtain carbon monoxide and a crude sodium bromide containing NaBr and C from the coke; the carbon monoxide is collected and used as raw material of water gas; during mixing, a mass of the coke is 0.1-1.0 kg per kilogram of the crude bromine salt;

(2) water dissolution and filtration: the crude sodium bromide obtained in step (1) is added to distilled water for dissolution and filtration to obtain insoluble impurities containing C and a leachate containing NaBr;

(3) concentrated crystallization under vacuum heating: the leachate containing NaBr obtained in step (2) is concentrated and crystallized by vacuum heating to obtain sodium bromide (NaBr); this step (3) is carried out in a vacuum evaporation device, which includes an evaporator, a solvent collecting tank and a vacuum system; the evaporator is in communication with the solvent collecting tank and the vacuum system respectively, a condenser and a material head tank are arranged on the evaporator and respectively in communication with the evaporator, and the vacuum system is in communication with the condenser and the solvent collecting tank respectively, so that pressure in the condenser can be kept balanced with that of the solvent collecting tank and liquefied solvent in the condenser flows into the solvent collecting tank automatically.

2. A method for producing and purifying sodium bromide using the coke from pyrolysis residues of waste circuit boards as reducing agent according to claim 1, characterized in that, during the water dissolution and filtration, a liquid-solid volume/mass ratio of distilled water to the crude sodium bromide is 8:1~3:1 (L/kg), the water dissolution and filtration of step (2) is conducted at a temperature of 50~80° C. for 20-60 min.

3. A method for producing and purifying sodium bromide using the coke from pyrolysis residues of waste circuit boards as reducing agent according to claim 1, characterized in that, the concentrated crystallization of step (3) is conducted at a temperature of 60-150° C. for 30-60 min.

* * * * *